United States Patent [19]

Mortenson

[11] Patent Number: 4,895,192
[45] Date of Patent: Jan. 23, 1990

[54] PROCESS AND APPARATUS FOR FILLING A CONSTANT SPEED DRIVE

[75] Inventor: Jerome A. Mortenson, Rockford, Ill.

[73] Assignee: Sundstrand Corporation, Rockford, Ill.

[21] Appl. No.: 137,579

[22] Filed: Dec. 24, 1987

[51] Int. Cl.⁴ .............................................. B65B 31/02
[52] U.S. Cl. ........................................ 141/5; 141/46; 141/59; 141/85; 137/625.68
[58] Field of Search ...................... 141/1, 5, 46, 59, 85; 137/625.67, 625.68, 625.69, 625.34, 625.35

[56] References Cited

U.S. PATENT DOCUMENTS

| | | | |
|---|---|---|---|
| 3,600,106 | 8/1971 | Baits et al. | 74/687 |
| 3,733,924 | 5/1973 | Zentz et al. | 74/687 |
| 3,964,506 | 6/1976 | Grundman | 137/85 |
| 3,995,727 | 12/1976 | Ivey | 74/467 |
| 4,537,284 | 8/1985 | Breisinger et al. | 184/7.4 |

Primary Examiner—Henry J. Recla
Assistant Examiner—Edward C. Donovan
Attorney, Agent, or Firm—Antonelli, Terry & Wands

[57] ABSTRACT

A service valve (10) is provided to provide an apparatus and method for filling a constant speed drive without overfilling and for preventing gas entrapment in the oil circuit of the drive. The valve (10) has a spool (12) movable in response to pressure from a filling fluid so as to connect the filling fluid with the drive circuit until a predetermined level has been reached at which point a signal is generated to allow the operator to remove the source of filling fluid. An air vent float valve (44) and a pressure switch (28) in the oil circuit allow the trapped gas to be vented from the oil circuit.

16 Claims, 2 Drawing Sheets

FIG. I.

PROCESS AND APPARATUS FOR FILLING A CONSTANT SPEED DRIVE

TECHNICAL FIELD

The present invention relates to a service valve and, more particularly, to a service valve of the type which will prevent overfilling of and gas entrapment in an oil circuit for an integrated drive generator (IDG) and its external cooling circuit as part of a constant speed drive (CSD) when installed and serviced, for example, in aircraft by filling the CSD system when it is not operating and providing pressurization of the oil circuit as the system is being filled.

BACKGROUND ART

A CSD system of the general type referred to herein for use in aircraft installations is shown in U.S. Pat. No. 3,733,924. The system disclosed therein employs a mechanical differential in conjunction with a hydrostatic transmission to rotate an aircraft alternator at constant speed via power supplied from a variable speed aircraft engine. The hydrostatic transmission is associated with a closed hydraulic circuit. Fluid is supplied to the circuit through a charge pump from a sump. Fluid pressure is regulated by a charge relief valve. An external circuit is provided for the IDG. However, this system does not address the problem of how to refill external cooling lines connected to the CSD to make up for lost fluid so that the lines are filled with fluid while being completely purged of air.

Another aircraft CSD system is shown in U.S. Pat. No. 3,600,106. This system aims at reducing the required component weight in aircraft by providing a sump pressurization approach which eliminates the need for external engine bleed hardware. This aim is achieved by supplying air-entrained liquid into the transmission sump to attain a sufficient inlet head for the scavenge pump to maintain a desired efficiency level. A relief valve maintains a preset charge pressure in the fluid circuit. A differential pressure valve is used to maintain a sufficient pressure within a transmission sump so that there is sufficient pressure head at the inlet of a scavenge pump used for drawing leaking fluid from the transmission sump and delivering that fluid to the return conduit.

A charge pump is utilized to provide makeup, lubricating and control fluid for the system. The charge or makeup fluid is fed through a conduit connected to a port in a hydraulic drive to make up for loss of fluid caused by leakage. Excess charge fluid flows over a charge relief valve which maintains a preset charge pressure in the conduit. A sump is provided in the case of the CSD to collect leakage fluid which is then pumped by means of a scavenge pump to a return conduit which passes through an external cooling circuit, i.e. the cooler is located outside the case or housing of the CSD system, and then to a reservoir where air entrained in the fluid is separated before the fluid is returned to the charge pump. However, no provision is made in this system for filling the conduits in the external cooling circuit and the rest of the system with fluid and completely purging the circuit of air during the filling process when the system is not in operation.

Valves with movable spools have long been known for variety of uses. For example, U.S. Pat. No. 4,537,284 discloses a progressive distributor valve for distributing lubricant to heddles of weaving machines. However, this valve is not designed for the purpose of pressurizing an oil circuit at the same time that it is being filled. Also, there is no concern about purging air from the lubricant inasmuch as the lubricant is discharged through channels into an air space in the form of heddle guide grooves.

U.S. Pat. No. 3,964,506 shows a pressure control system which provides for rapid filling and emptying of a clutch cylinder during engagement and disengagement of the clutch. The system uses a relief type pressure regulating valve, a solenoid-operated pilot valve and a flow control valve. However, these types of valves are not intended to operate as service valves strictly by pressure actuation and so as to provide their own pressure regulation when the system is not operating.

U.S. Pat. No. 3,995,727 shows the use of a valve to provide additional cooling to the clutch of an automatic transmission. However, it will be readily appreciated that the arrangement and activation of this valve is not at all useful for service valve applications requiring high pressure fill and air purge capability.

DISCLOSURE OF THE INVENTION

It is an object of my invention to provide a service valve which overcomes the problems and disadvantages encountered with prior art devices.

More specifically, it is an object of my invention to utilize a pressure actuated service valve to provide makeup fluid for a system when the system is not in operation.

It is yet another object of my invention to provide a service valve which regulates its own pressure by virtue of being pressure activated.

It is still a further object and advantage of the service valve according to my invention which permits filling of the external cooling circuit of a CSD even when the drive is not operating.

Another object of my invention is to provide a means of pressurizing the external cooling oil circuit as it is filled in order to eliminate trapped air pockets

BRIEF DESCRIPTION OF THE DRAWINGS

These and further features, objects and advantages of my invention will become readily apparent from the following detailed description of a presently preferred embodiment when taken in conjunction with the accompanying drawings which show, for purposes of illustration only, the service valve apparatus in a CSD system for carrying out the method of my invention and, more specifically.

DETAILED DESCRIPTION OF A PREFERRED EMBODIMENT

To assist in better understanding my invention and with a view toward conciseness, I deem it preferable not to show the entire CSD-IDG hydraulic circuit since conventional systems are shown in the U.S. Pat. Nos. 3,600,106 and 3,733,924 discussed above. Understanding of my invention will be facilitated by showing schematically only those parts of the CSD necessary for making and using the service valve.

Figure 1:
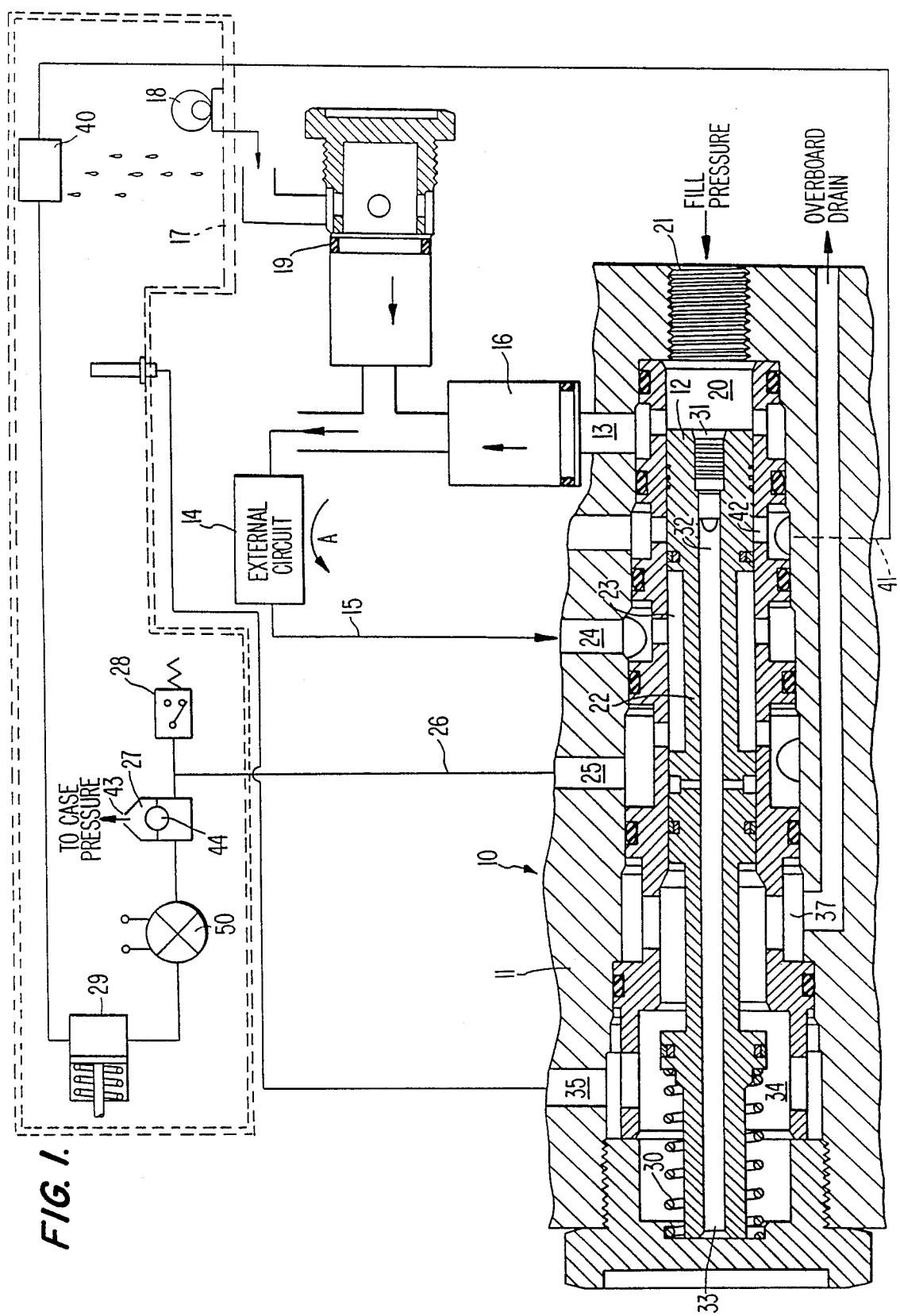
FIG. 1 shows a service valve installed in a CSD system (shown schematically) in a service position of the valve wherein the system is being filled with makeup fluid.

A presently preferred embodiment of the service valve in accordance with my invention is designated generally by the numeral 10 in FIG. 1. It is used to fill the CSD case when the system is otherwise not operating, i.e. when the aircraft engine is not being used to drive a CSD which requires the use of fluid for control and lubrication. The valve 10 comprises an outer casing 11 and an axially movable spool 12 slidably and fluid tightly disposed within a bore in the casing 11. Again, so as not to obscure my invention, I will not describe conventional rings and packings used to make the valve fluid tight. A biasing means such as a spring 30 is placed in the valve casing 11 to abut against one face of the casing 11 and an end face of the spool 12 to bias the latter normally toward the inlet 21. It is in this normal position that the CSD will be operating as described hereinafter.

The casing 11 has a number of openings or ports for connection to various parts of the system. Port 13 near the inlet end of the casing 11 allows fluid such as oil to circulate through an external cooler 14 (i.e. external of the CSD case) and return to the valve 10 through port 24 in the casing 11 through the line or conduit 15 as shown by arrow A. This circulation occurs both during normal operation of the CSD and when the service valve is utilized to provide makeup fluid in the system. A check valve 16 is provided in the line 15 between the opening 13 and the cooler unit 14. A case sump 17 provides fluid to the circuit line 15 during normal system operation by means of a scavenge pump 18 and a check valve 19. Oil under pressure is admitted to the bore 20 at the inlet 21 of the casing 11 having a quick disconnect for attachment to an external source of pressurized fluid for the purpose of providing makeup fluid without entrapping any gas in the system.

Figure 2:
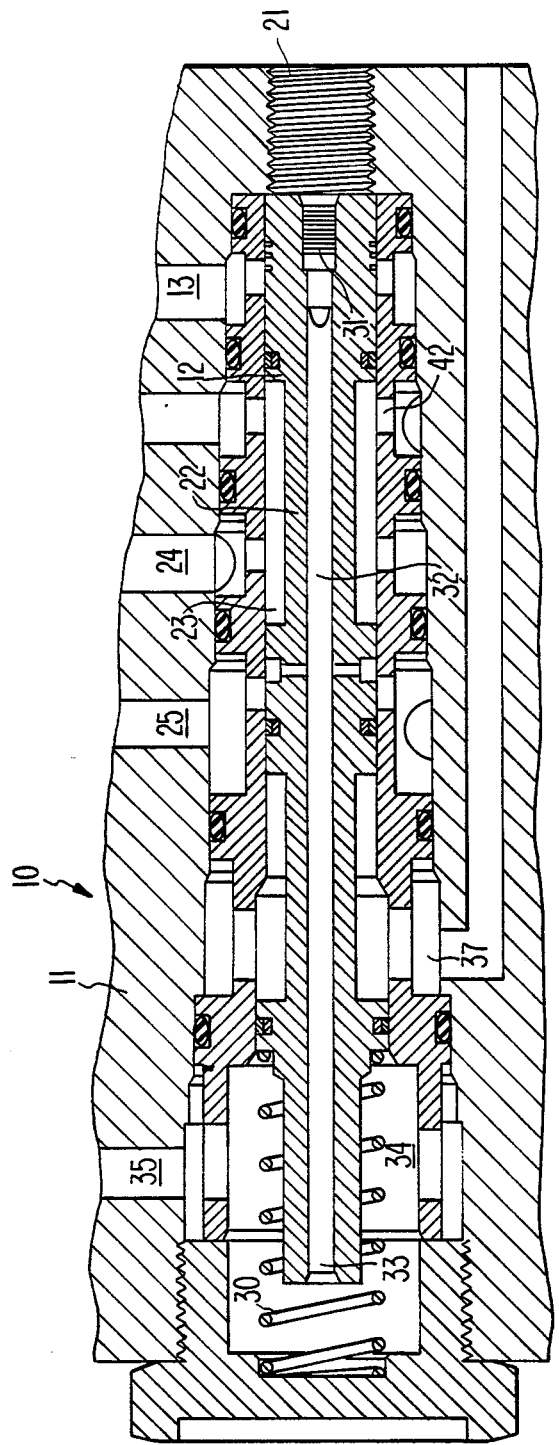
FIG. 2 shows the service valve of FIG. 1 installed in the same CSD system but in a normal position assumed when the CSD system is in operation and the service valve is not being used to supply makeup fluid.

When it is desired to service the system, the scavenge pump 18 is shut off, and the external source of pressurized fluid is quickly hooked up to the inlet 21 forcing the spool to the leftward position shown in FIG. 1 from the rightward position shown in FIG. 2. The pressurized fluid such as oil then passes through the port 13 communicating the bore 20 and the inlet conduit for the external circuit 14. A check valve 16 is placed in the inlet conduit to prevent backflow. At the same time that the pressure fill is passing through port 13, the piston or spool 12 is forced rearwardly in the valve casing 11 by the pressure from the oil in bore 20. The spool 12 has a narrowed portion 22 which defines an oil-admitting space 23 which communicates with the port 24 both during normal CSD operation (FIG. 2) and during servicing (FIG. 1). The port 24 is connected to the outlet conduit or line 15 of the external cooler circuit 14. As pressurized oil fills space 23 from conduit 15 in the position of spool 12 in FIG. 1, the oil exits from the valve casing 11 through a port 25 also communicating with space 23, which port 25 is connected to a conduit 26.

The conduit 26 is in communication with an air purging float valve 27. As fluid is fed into conduit 26, air is forced out through an opening 43 in the float valve 27. When the fluid reaches the level of the float valve 27, the float ball 44 rises to close off the air vent opening 43 allowing fluid pressure to build up in conduit 26. At this point a signal is sent to the operator indicating that the servicing of the external circuit is complete.

A pressure sensor 28 is located intermediate the port 25 and the float valve 27. At a predetermined point, the pressure build-up activates the pressure sensor 28 which, in turn, activates a solenoid 50 connected to an accumulator 29. Oil is fed to the accumulator 29 until a fluid level indicator (not shown) in the accumulator indicates that the accumulator is full. The solenoid to the accumulator is then deactivated.

A small amount of oil is transmitted to the IDG case by leakage across the spool 12 between bore 20 and port 42. A slight clearance too small to be shown in the drawings between the spool 12 and the casing which communicates with the bore 20 provides for this leakage. This oil is fed into the IDG case through conduit 41. An IDG standpipe 36 is provided to allow a visual indication of fill level in the IDG case. When the oil level in the case reaches the top of the standpipe, oil overflow is directed through conduit 45 and port 37 to an overboard drain. The flowing out of oil through the overboard drain line together with the signal for external circuit service completion indicate that the operator should discontinue servicing the unit.

The operator then disconnects the quick disconnect nozzle from the inlet 21. However, some oil will still remain under pressure in the valve casing and will thus retard the spool from returning to its normal position (FIG. 2) so as to close off port 13 to the external circuit 14 and connect a deaerator 40 of conventional structure (and used in a manner similar to that shown in the transmission system in U.S. Pat. No. 3,733,924 namely to remove air from the fluid during operation of the transmission) to the hydraulic circuit via a conduit 41 connected to port 42 which communicates with space 23 when the spool 12 is in its normal position (FIG. 2).

To allow the spool 12 to return to its normal non-fill position under the urging of spring 30, a bleed orifice 31 is provided through the central axis of the spool 12 to permit the fluid under pressure to bleed therethrough as a result of the leftward biasing action in the spool and into the orifice 32 arranged along the central axis of the spool. The fluid in the orifice 32 then can exit from the rear of the spool 33 which, at this time, has moved away from the wall of the casing 11. The orifice 32 is also then in communication with a space 34 surrounding the spool 12. A port 35 communicates the space 34 to the IDG standpipe 36, and a port 37 communicates the space 34 to an overboard drain for carrying away excess fluid and venting the valve.

During normal operation of the CSD system in, for example, an aircraft installation, the service valve 10 and, more particularly, the spool 12, will be in the position shown in FIG. 2. Fluid from the IDG is pumped via the scavenge pump 18 from the case sump 17 to the external cooler circuit and from there back into the service valve casing 11 where it enters through the port 24 into the annular space 23 and thence exits through the port 42 after passing through the deaerator and is directed back toward the case (which, as previously stated, is not shown but surrounds the various parts shown in the drawing with the exception of the external cooler circuit 14). The fluid in the standpipe 36 provides a reservoir of fluid to show that the fluid level in the case is not above a certain desired amount. If fluid emerges from the open end of the standpipe, the case has been overfilled.

While I have shown and described a presently preferred embodiment in accordance with my invention, it should be understood that the same is susceptible to numerous changes and modifications as will be apparent to one skilled in this art. I, therefore, do not wish to be limited to the details shown and described herein but intend to cover all such changes and modifications as are encompassed by the scope of the appended claims.

I claim:

1. A process for filling a hydraulic system with fluid under pressure in such a manner as to prevent overfilling while, during the filling process, permitting gas trapped in the system to escape, comprising the steps of:
   (a) connecting a valve with conduits of the system through ports in a casing of the valve such that a movable control piston within the casing can selectively communicate the conduits with the filling fluid;
   (b) connecting a source of the fluid under pressure to an inlet of the valve casing and thereby moving the control piston inside the valve casing to a position where selected conduits are selectively communicated with the filling fluid;
   (c) first permitting the filling fluid to flow through a first one of the ports connected by one of the conduits to an external circuit;
   (d) thereafter filling the valve with sufficient fluid to cause the fluid supplied to the external circuit to return to the interior of the valve casing through a return conduit connected between the external circuit and a second one of the ports in the valve casing;
   (e) directing the fluid returned to the interior of the valve from the external circuit through a third one of the ports which is connected to a conduit communicating with an air purging float valve and pressure responsive switch means;
   (f) further directing the fluid to a casing of the system until the casing is filled to the desired level;
   (g) creating a pressure build-up in the conduit communicating the air purging float valve and the third port until a predetermined pressure is reached;
   (h) causing the pressure responsive switch means to respond to a predetermined pressure as a result of the pressure build-up and to thereafter direct the filling fluid to an accumulator while providing a signal to an operator that a desired pressure has been reached and the system has been purged of trapped air; and
   (i) disconnecting the source of filling fluid from the inlet of the valve casing.

2. A process according to claim 1, wherein the external circuit is a cooler for the fluid used in the hydraulic system.

3. A process according to claim 1, wherein the fluid under pressure remaining in the area of the piston at the inlet of the valve after the source is disconnected bleeds through an orifice in the piston and is vented outside the valve.

4. An apparatus for filling conduits of a hydraulic system with fluid under pressure in such a manner as to prevent overfilling while, during a filling operation, permitting gas trapped in the system to escape, comprising:
   (a) an external hydraulic circuit;
   (b) a valve including a casing with an inlet for connection to a source of fluid, a control piston slidable in the casing, biasing means for normally biasing the piston toward the inlet, and ports through the casing;
   (c) a first one of the ports communicating with the external circuit through a first conduit for supplying fluid under pressure from the inlet of the valve to the external circuit;
   (d) a second one of the ports communicating with the external circuit through a second conduit for returning the fluid under pressure from the external circuit to the interior of the casing where the slidable piston has an annular space defined by its circumference and the inner wall of the casing;
   (e) means in the control piston defining an annular space between the piston and an inner wall of the casing for selectively communicating the first and second of the ports during the filling operation when the piston has been moved in opposition to the biasing means;
   (f) air purging float valve;
   (g) an accumulator;
   (h) a case for the hydraulic system;
   (i) a third one of the ports in communication with the annular space of the selective communication means in the control piston also communicating with the case via a conduit through the float valve;
   (j) a pressure responsive switch means for sensing the pressure in the conduit associated with the air purging float valve and selectively admitting the fluid from the third of the ports to the accumulator, wherein during the filling operation the filling fluid under pressure is returned to the valve from the external circuit and is transmitted to the case until a predetermined pressure is reached, at which point the pressure responsive switch means directs the fluid to the accumulator and cause a signal to be transmitted to an operator to indicate that the filling operation is complete and entrapped gas has been removed from the system.

5. An apparatus according to claim 4, wherein the external circuit constitutes a cooler for the fluid.

6. An apparatus according to claim 4, wherein the case includes a sump for collecting fluid accumulating in the case, and scavenge pump means for pumping fluid through the system for regulation and/or lubricating purposes during operation thereof.

7. An apparatus according to claim 6, wherein a deaerator is provided in the system for deaerating the fluid in the system during operation thereof.

8. An apparatus according to claim 7, wherein the selective communication means in the control piston disconnects the deaerator from the system during the filling operation.

9. An apparatus according to claim 4, wherein the inlet of the valve includes a quick disconnect for permitting quick removal of an external source of fluid under pressure.

10. An apparatus according to claim 4, wherein a bleed orifice is provided in the control piston at an end facing the inlet so that upon completion of the filling operation and upon biasing of the piston back towards its normal position, the fluid near the inlet can be vented externally of the valve and permit the valve to return to its normal position 11. An apparatus according to claim 4, wherein there is further provided a sump in the case for collecting fluid accumulating in the case, and scavenge pump means for pumping fluid through the system for regulation and/or lubricating purposes during operation thereof.

12. An apparatus for filling conduits of a hydraulic system with fluid under pressure in such a manner as to prevent overfilling while, during a filling operation, permitting gas trapped in the system to escape, comprising:

a valve comprising an inlet for connection to a source of fluid, a control piston slidable in the casing, biasing means for normally biasing the piston toward the inlet, and ports; a first one of the ports serving to supply fluid under pressure from the valve, a second one of the ports serving to return the fluid under pressure to the interior of the valve; means for selectively communicating the first and second of the ports during the filling operation when the piston has been moved in opposition to the biasing means; and air purging float valve; an accumulator; a case for the hydraulic system; a third one of the ports operatively associated with the selective communication means and with the case; and pressure responsive switch means for sensing the pressure in a conduit associated with the air purging float valve and selectively admitting the fluid from the third of the ports to the accumulator, wherein, during the filling operation, the filling fluid under pressure is returned to the valve and transmitted to the case until a predetermined pressure is reached, at which point the pressure responsive switch means directs the fluid to the accumulator and causes a signal to be transmitted to an operator to indicate that the filling operation is complete and entrapped gas has been removed from the system.

13. An apparatus according to claim 12, wherein the first and second ports are associated through an external circuit.

14. An apparatus according to claim 12, wherein the inlet of the valve includes a quick disconnect for permitting quick removal of an external source of fluid under pressure.

15. An apparatus according to claim 12, wherein a bleed orifice is provided in the control piston at an end facing the inlet so that upon completion of the filling operation and upon biasing of the piston back towards its normal position, the fluid near the inlet can be vented externally of the valve and permit the valve to return to its normal position.

16. An apparatus according to claim 12, wherein the case includes a sump for collecting fluid accumulating in the case, and scavenge pump means for pumping fluid through the system for regulation and/or lubricating purposes during operation thereof.

* * * * *